(12) United States Patent
Hugon et al.

(10) Patent No.: US 10,975,720 B2
(45) Date of Patent: Apr. 13, 2021

(54) BALANCING SYSTEM FOR AN AIRCRAFT TURBOMACHINE

(71) Applicant: SAFRAN AIRCRAFT ENGINES, Paris (FR)

(72) Inventors: Nadège Pauline Audrey Hugon, Montgeron (FR); Thomas Giraudeau, Bourg la Reine (FR); Jean-Marc Claude Perrollaz, Moissy-Cramayel (FR); Baptiste René Roger Batonnet, Moissy-Cramayel (FR); Romain Nicolas Lagarde, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 91 days.

(21) Appl. No.: 16/527,445

(22) Filed: Jul. 31, 2019

(65) Prior Publication Data

US 2020/0040764 A1 Feb. 6, 2020

(30) Foreign Application Priority Data

Jul. 31, 2018 (FR) ........................................ 1857171
Jul. 30, 2019 (FR) ........................................ 1908695

(51) Int. Cl.
*F01D 25/04* (2006.01)
*F01D 25/24* (2006.01)

(52) U.S. Cl.
CPC ............. *F01D 25/04* (2013.01); *F01D 25/24* (2013.01); *F05D 2230/60* (2013.01); *F05D 2260/96* (2013.01)

(58) Field of Classification Search
CPC ...... F01D 25/04; F01D 25/24; F05D 2230/60; F05D 2260/96

USPC ....................................................... 415/214.1
See application file for complete search history.

(56) References Cited

U.S. PATENT DOCUMENTS

| 4,716,761 A | 1/1988 | Ito et al. | |
|---|---|---|---|
| 2010/0316496 A1* | 12/2010 | Williams | F01D 5/027 416/144 |
| 2014/0023504 A1 | 1/2014 | Fernandez et al. | |
| 2015/0226087 A1* | 8/2015 | Lefebvre | F01D 5/3007 415/214.1 |
| 2017/0370224 A1* | 12/2017 | Porter | F01D 11/006 |

FOREIGN PATENT DOCUMENTS

| FR | 2 986 046 A1 | 7/2013 |
|---|---|---|
| FR | 2 996 255 A1 | 4/2014 |
| WO | 2010/112453 A1 | 10/2010 |

OTHER PUBLICATIONS

Preliminary Search Report issued in French Patent Application No. 1857171 dated Mar. 19, 2019.

* cited by examiner

*Primary Examiner* — Joseph J Dallo
*Assistant Examiner* — Yi-Kai Wang
(74) *Attorney, Agent, or Firm* — Pearne & Gordon LLP

(57) ABSTRACT

The invention relates to a balancing system of an aircraft turbomachine comprising a first annular row of first mounting ports for mounting balancing members, and a second annular row of second mounting ports for mounting balancing members which is axially offset from the first annular row, the number and angular positions of the first mounting ports being identical to the number and angular positions of the second mounting ports.

15 Claims, 7 Drawing Sheets

BALANCING SYSTEM FOR AN AIRCRAFT TURBOMACHINE

TECHNICAL FIELD

The invention relates to the field of balancing an aircraft turbomachine. It more precisely relates to a turbomachine balancing system, as for example that described in document FR 2 996 255 A1.

The invention is applicable to any type of turbomachine, such as a turbojet engine or a turboprop engine.

STATE OF PRIOR ART

A turbomachine is generally equipped with several modules assembled to each other. Prior to this assembly, each module is dynamically balanced so as to reduce its unbalance. After this assembly, it is the turbomachine equipped with all its modules which undergoes a balancing, using a system therefor on a rotary inlet cowl of the turbomachine.

The balancing system conventionally comprises an annular row of mounting ports, in which balancing members have to be mounted. These members can be balance weights, balance screws, or similar elements. By wisely disposing these balancing members in the mounting ports, the overall turbomachine unbalance can be reduced, and the turbomachine can be considered as balanced.

This balancing step is usually made after mounting, before delivering the turbomachine. Further, throughout its life, the turbomachine also undergoes rebalancing steps, implemented in a similar way to the balancing made after mounting. Indeed, such a rebalancing is generally made by placing new balancing members in still empty ports of the annular row.

However, each balancing system has a maximum balancing capacity which is dictated by several criteria. It can be in particular the number of mounting ports of the annular row, the number of references for the balancing members (each reference having a different mass), or even the diameter of the annular row, determining the maximum permissible length of the balancing members. In this regard, it is set out that the maximum permissible length of the balancing members can also be determined by risks of interactions between the inner radial ends of these members, when the mounting ports turn out to be very close to each other.

When the maximum balancing capacity is reached, lengthy and expensive maintenance operations have to be contemplated on the turbomachine, as for example a new distribution of the fan blades about the fan disc.

To delay the performance of such interventions during the life of the turbomachine, the largest balancing capacity possible is obviously search for. However, conventional designs of balancing systems have the limits reminded above, which turn out on the other hand to be all the more restrictive as the dimensions of the inlet cowl are low.

Therefore, there remains a need for optimising design of turbomachine balancing systems, in order to increase their maximum balancing capacity, while offering a simple implementation for operators.

SUMMARY OF THE INVENTION

To fulfil at least partially this need, a first object of the invention is a balancing system for an aircraft turbomachine having a longitudinal central axis, the system comprising a first annular row of first mounting ports for mounting balancing members, and also a second annular row of second mounting ports for mounting balancing members axially offset from the first annular row, the number and the angular positions of the first mounting ports being identical to the number and angular positions of the second mounting ports.

Another object of the invention is a method for mounting a turbomachine comprising a step of balancing the turbomachine, this balancing step including the following operations of:

temporarily balancing the turbomachine using at least one first balancing member mounted to at least one first mounting port of the first annular row, and by leaving each of the second mounting ports of the second annular row empty;

removing the first balancing members assembled during the previous operation; and repeating the temporary balancing on the second annular row, by mounting one or more second balancing members on the second mounting port(s) axially arranged facing said at least one first mounting port that has been equipped with at least one first balancing member during the temporary balancing operation, the second balancing member(s) being chosen such that for each second mounting port concerned, the second member(s) provide an unbalance correction identical or similar to that achieved with the first balancing member(s) that have equipped the corresponding first mounting port during the temporary balancing operation.

Another object of the invention is a maintenance method for a turbomachine comprising a step of rebalancing the turbomachine, this rebalancing step being made from the balancing system already provided with at least one second balancing member on at least one second mounting port of the second annular row, and possibly also already provided with at least one first balancing member on at least one first mounting port of the first annular row, the rebalancing step being implemented without modifying the distribution of the second balancing member(s) on the second annular row of second mounting ports, but only by adding, modifying or removing at least one first balancing member on at least one first mounting port of the first annular row.

The invention is remarkable in that it drastically breaks with prior solutions, by providing several annular rows of mounting ports for receiving balancing members, and preferably two rows axially spaced apart from each other. With this design, it is possible to increase the maximum balancing capacity of the turbomachine, while offering a simple implementation of the balancing/rebalancing operations for the operators.

Indeed, as regards the first balancing step made on the workbench after mounting, before delivering the turbomachine, the invention is particularly advantageous in that it enables a temporary balancing to be made on that of both annular rows which is more accessible, and/or which has the most conventional design. Thus, the performance of this first operation is advantageously identical or similar to that usually performed by operators on known systems, with a single annular row. Then, the removal of the balancing members previously assembled on the first row, and afterwards the repetition of the temporary balancing on the second row, which is less accessible and/or which has a design less used on existing turbomachines, are performed.

This latter repeating operation turns out to be interesting first in that it does not require rebalancing operations for the turbomachine. It simply requires a transposition of balancing members to reproduce, on the second row and with other balancing members, an unbalance correction identical or similar to that obtained at the end of the temporary balancing performed on the first row.

The repetiting operation is also interesting in that it enables the turbomachine to be delivered with the first annular row fully empty, offering a large rebalancing capacity during the lifetime of this turbomachine. In addition, these subsequent rebalancing steps remain simple to implement, since they can be performed on that of both annular rows which is more accessible, and/or which has the most conventional design.

More generally, the invention is remarkable in that it provides performing a temporary balancing operation on the first row, and then recreating an identical or equivalent unbalance on the second row, in order to release the first row for the purpose of subsequent rebalancing steps during the lifetime of the aircraft.

The invention thus enables the operators to preserve conventional balancing techniques, both during manufacture or during maintenance operations, while strongly increasing the maximum balancing capacity of the turbomachine.

The invention preferably provides at least one of the following optional technical characteristics, taken alone or in combination.

The first ports are radially oriented, and the second ports are axially oriented. However, a reverse situation could be contemplated, as well as a situation in which all the first and second ports would be axially or radially oriented, without departing from the scope of the invention.

The first annular row is arranged downstream of the second annular row. Once again, a reverse situation could be retained, by placing the first row upstream of the second one. However, the importance in placing the first row downstream of the second one resides in its capacity for it to assume a higher diameter, and to further space the first mounting ports apart from each other. The temporary balancing operation, as well as the subsequent rebalancing steps, are consequently advantageously facilitated.

An axial offset between the first and second annular rows is preferably between 10 and 70 mm.

Each of the first and second mounting ports is:
either free of balancing member;
or equipped with one or more balancing members.

However, after the first balancing of the turbomachine, several of the second mounting ports are each preferentially equipped with at least one balancing member, and others of these second ports remain free of balancing members.

The number of first mounting ports is between 15 and 25, and preferably equal to 20. Therefore, the same is true for the number of second mounting ports.

Another object of the invention is a rotary inlet cowl for a turbomachine comprising such a balancing system, the cowl preferably comprising a nose cone extending downstream by a shell fixedly mounted to this nose cone. The first annular row can be provided on the nose cone or on the shell, as the second annular row. Likewise, the first row could be arranged on one of the elements from the shell and the nose cone, and the second row arranged on the other of these two elements, without departing from the scope of the invention.

According to a preferred embodiment, the first mounting ports of the first annular row are accessible from outside the cowl, and the second mounting ports of the second annular row are radially covered with a cowl element, preferably the nose cone.

Preferably, the shell includes an upstream extension comprising a first extension part through which the first mounting ports of the first annular row are made, and, in the upstream continuity of the first extension part, a second extension part through which the second mounting ports of the second annular row are made, said second extension part being radially covered with the front cone.

Preferably, the cowl includes a sealing device between the first extension part and the downstream end of the cone.

Finally, the invention relates to an aircraft turbomachine comprising such a rotary inlet cowl.

Further advantages and characteristics of the invention will appear in the non-limiting detailed description herein below.

BRIEF DESCRIPTION OF THE DRAWINGS

This description will be made with regard to the appended drawings in which.

DETAILED DISCLOSURE OF PREFERRED EMBODIMENTS

Figure 1:
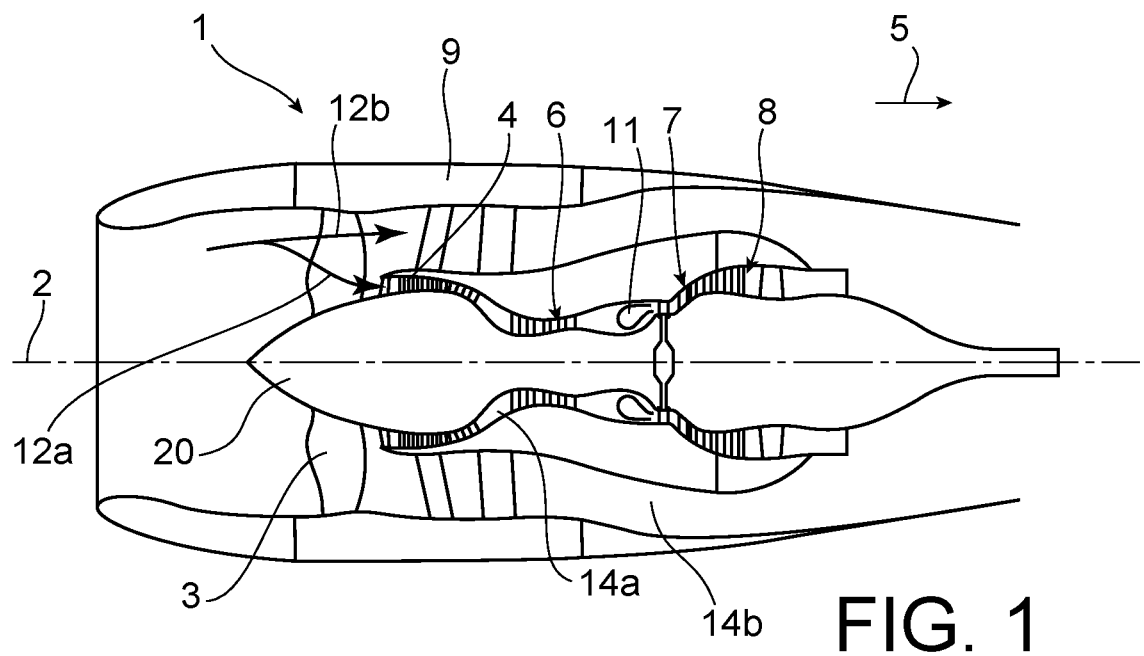
FIG. 1 is an axial cross-section schematic view of a dual flow turbojet engine according to the invention.

In reference first to FIG. 1, an aircraft turbomachine 1 is represented according to a preferred embodiment of the invention. This is here a twin spool dual flow turbojet engine. However, it could be a turbomachine of another type, for example a turboprop engine, without departing from the scope of the invention.

The turbomachine 1 has a longitudinal central axis 2 about which its different components extend. It comprises, from upstream to downstream along a main direction 5 of gases through this turbomachine, a fan 3, a low pressure compressor 4, a high pressure compressor 6, a combustion chamber 11, a high pressure turbine 7 and a low pressure turbine 8.

Conventionally, after it passed through the fan, air is divided into a central primary flow 12a and a secondary flow 12b which surrounds the primary flow. The primary flow 12a flows in a main stream 14a for circulating the gases passing through the compressors 4, 6, the combustion chamber 11 and the turbines 7, 8. The secondary flow 12b in turn flows in a secondary stream 14b radially outwardly delimited by an engine case, surrounded by a nacelle 9.

Upstream the fan 3, the turbojet engine 1 includes a generally conically shaped rotary inlet cowl 20 centred on the axis 2. This cowl 20 is shown in further detail in FIG. 2.

It comprises a nose cone 22 defining the tip 24 of the cowl 20, as well as a rear shell 26 being a downstream extension of the nose cone 22. The rear shell 26 is fixedly mounted to the nose cone 22, through fastening bolts 28 axially oriented and clamping two fastening clips 32, 33 arranged substantially radially. The rear shell 26 has an aerodynamic surface which is in the continuity of an aerodynamic surface of the nose cone 22. This shell 26 extends downstream up to the carriers of the fan blades (not represented), to ensure an aerodynamic continuity with the same.

At its downstream end, the nose cone 22 has an annular recess 30 open radially outwards and axially upstream. This recess 30 is axially delimited by the fastening clip 32 of the nose cone, and radially by an inner ring 34 provided on this same cone. The recess 30 can be closed by a removable cowling 36, so as to remake the aerodynamic surface of the nose cowl 22 at this recess 30, containing in particular the head of the fastening bolts 28. The removable cowling can be of the cap type press fitted or clipped in the recess 30, or even a short screw, for example of titanium. Fitting a short screw can be made only if there is no balance screw already fitted in the recess 30. The short screw further optionally enables the crimped nut 46 which will be described after to be maintained.

Figure 2:
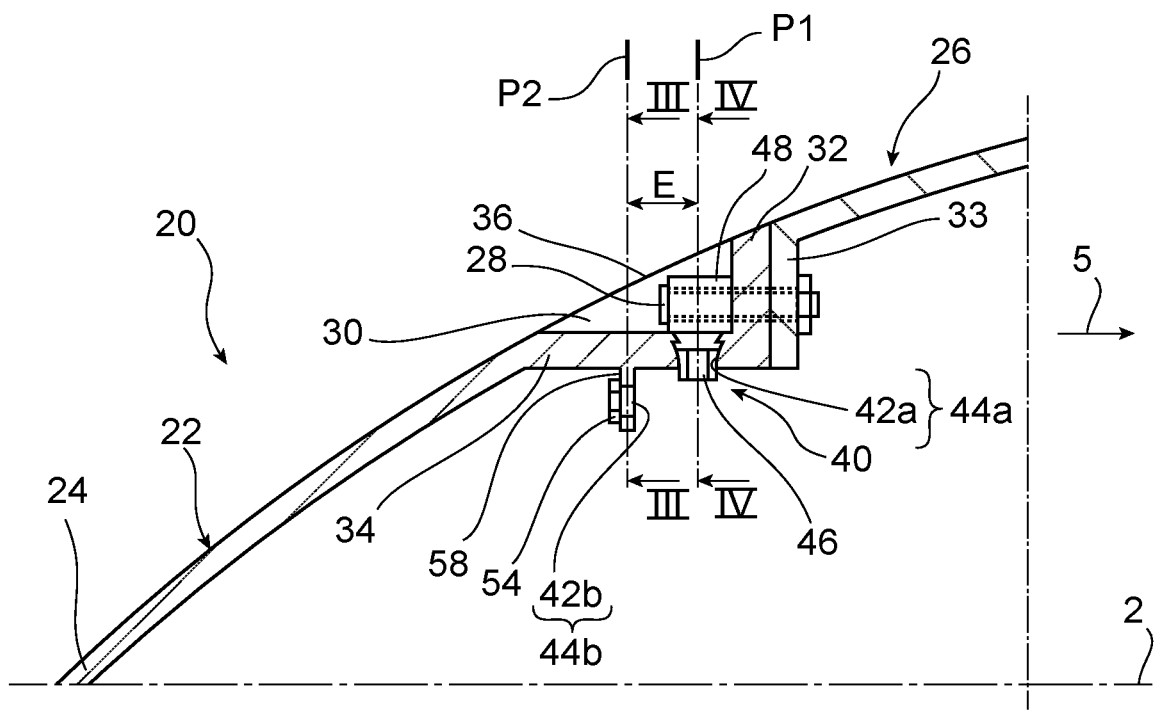
FIG. 2 is an enlarged axial cross-section view of a part of the rotary inlet cowl of the turbojet engine shown in the previous figure, the cowl being equipped with a balancing system according to a preferred embodiment of the invention.
Figure 3:
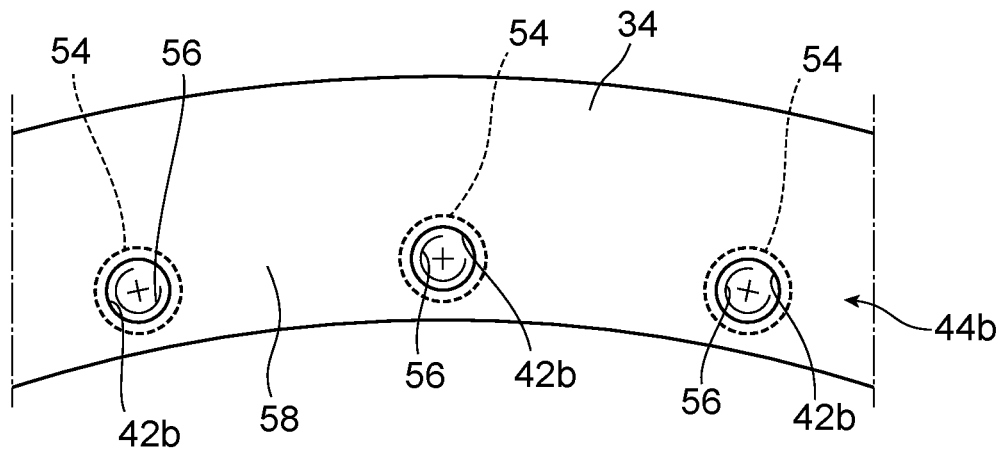
FIGS. 3 and 4 are cross-section views respectively taken along lines III-Ill and IV-IV of FIG. 2.
Figure 4:
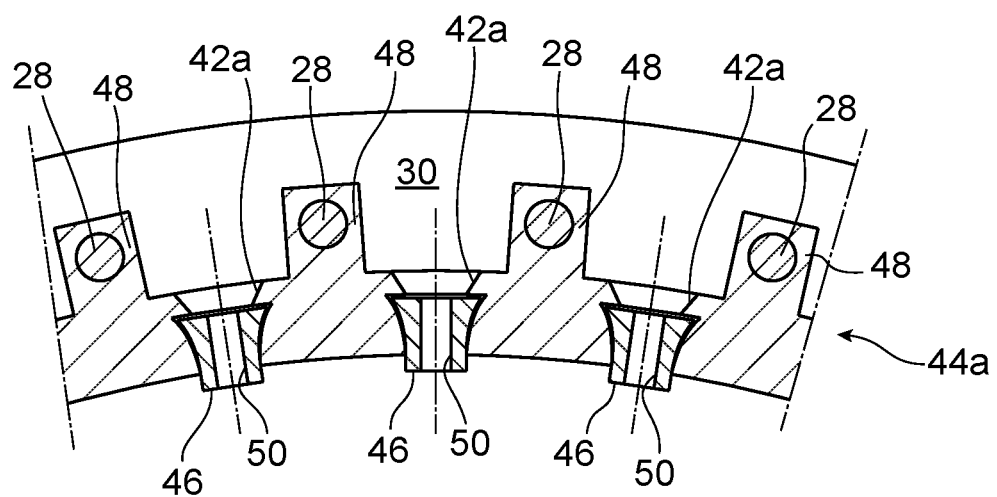

In reference to FIGS. 2 to 4 together, it is shown that the inlet cowl 20 is equipped with a balancing system 40 for the purpose of reducing the turbojet engine unbalance. Overall, this system 40 has the feature of comprising two distinct balancing planes, axially spaced apart from each other. The first balancing plane takes the form of a first annular row 44a of first mounting ports 42a. This row is centred on the axis 2, and its mounting ports are evenly distributed on the downstream end of the inner ring 34 they pass through. Each first mounting port 42a is radially oriented, and opens into the recess 30. In each of these ports 42a, a nut 46 is crimped/captive to receive a first balancing member (not represented in FIGS. 2 to 4), for passing through the port 42a and being screwed in a threaded inner port 50 of this nut 46.

It is noted that between two directly consecutive ports 42a, the nose cone 22 includes a counterbore 48 through which one of the fastening bolts 28 passes, each counterbore 48 locally increasing the thickness of the fastening clip 32.

This first balancing plane is referenced P1 in FIG. 2. It integrates all of the radial axes of the mounting ports 42a and their nuts 46. This is a conventional balancing plane, offering a very simple use for operators because of a facilitated access to the ports 42a, via the recess 30 from outside the inlet cowl 20.

This first plane P1 is completed with a second balancing plane, referenced P2 in FIG. 2, and axially spaced from the first plane by an offset/gap "E" for example between 10 and 70 mm.

In this first preferred embodiment of the invention, the second balancing plane P2 takes the form of a second annular row 44b of second mounting ports 42b. This row is also centred on the axis 2, and its mounting ports are evenly distributed on an inner balancing clip 58 through which they pass. The clip 58 extends radially inwardly from the inner ring 34 of the nose cone 22, and the second mounting ports 42b are axially oriented. The second balancing plane P2 passes through each of the centres of the second mounting ports 42b. Since it is preferentially arranged upstream of the first plane P1 within the nose cone 22, the second annular row 44b which represents it has a diameter lower than that of the first annular row.

At each of the ports 42a, a nut 54 is crimped/captive to receive a second balancing member (not represented in FIGS. 2 to 4), for passing through the port 42b and being screwed in a threaded inner port 56 of this nut 54. In addition, as will be described hereinafter, a second weight-shaped balancing member is also provided to be pressed against the clip 58, via the balance screw passing through the port 42b and screwed in the threaded inner port 56 of the nut 54. The unbalance induced at each second port 42b thus results from the mass of the balance screw, and that of the weight maintained by this screw.

It is noted that this second balancing plane P2 turns out to be less conventional, given that the access to the second axial ports 42b remains more complicated than the access to the first radial ports 42a.

Figure 4A:
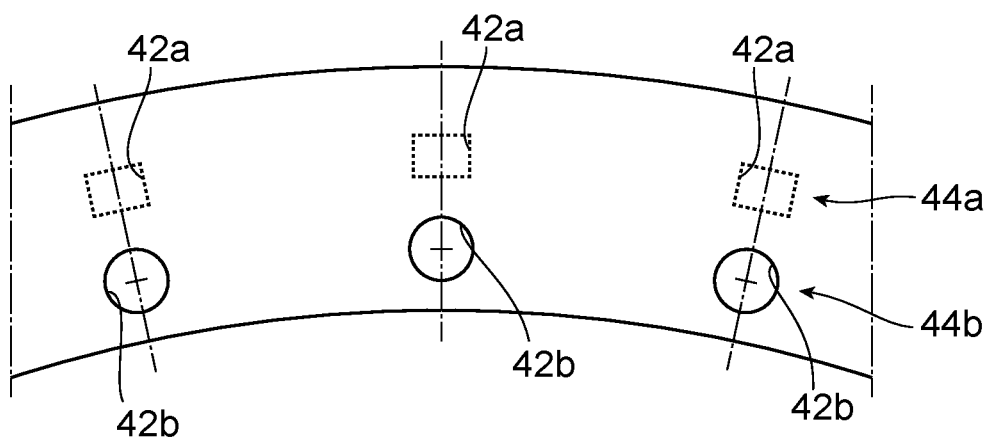
FIG. 4a is a schematic view representing the relative position of the different mounting ports forming the balancing system.

Another feature of the invention, depicted in FIG. 4a, resides in the number and angular positions of the first ports 42a, which are respectively identical to the number and angular positions of the second ports 42b. This number is, on the other hand, preferentially between 15 and 25, and further preferentially set to 20. Consequently, circumferential spaces between the first ports 42a are larger than those observed between the second ports 42b. The turbojet engine balancing is thereby simplified because it is made at the first balancing plane P1. That is why it is preferentially provided to use the first annular row 44a to perform a first balancing step during the turbojet engine mounting, that is after mounting of its different modules.

Figure 5:
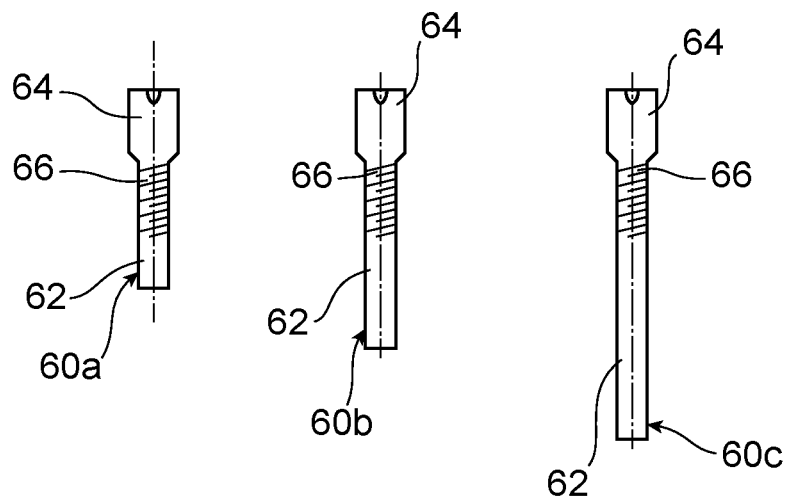
FIG. 5 represents a schematic view of three distinct references for the first balancing members of the system shown in the previous figure.

This balancing step specific to the invention has however some specificities, because the balancing made on the first annular row 44a turns out to be only temporary, as will be detailed hereinafter. Indeed, after mounting, the operators make a temporary balancing using the first balancing members, which take the form of first balance screws 60a, 60b, 60c depicted in FIG. 5. Each of these first screws has a different mass, related to the length of its shaft 62. On the other hand, they all have a screw head 64, as well as a thread 66 arranged between the head and the shaft. By way of example, these can be three references of first screws, each having a different mass.

Figure 6:
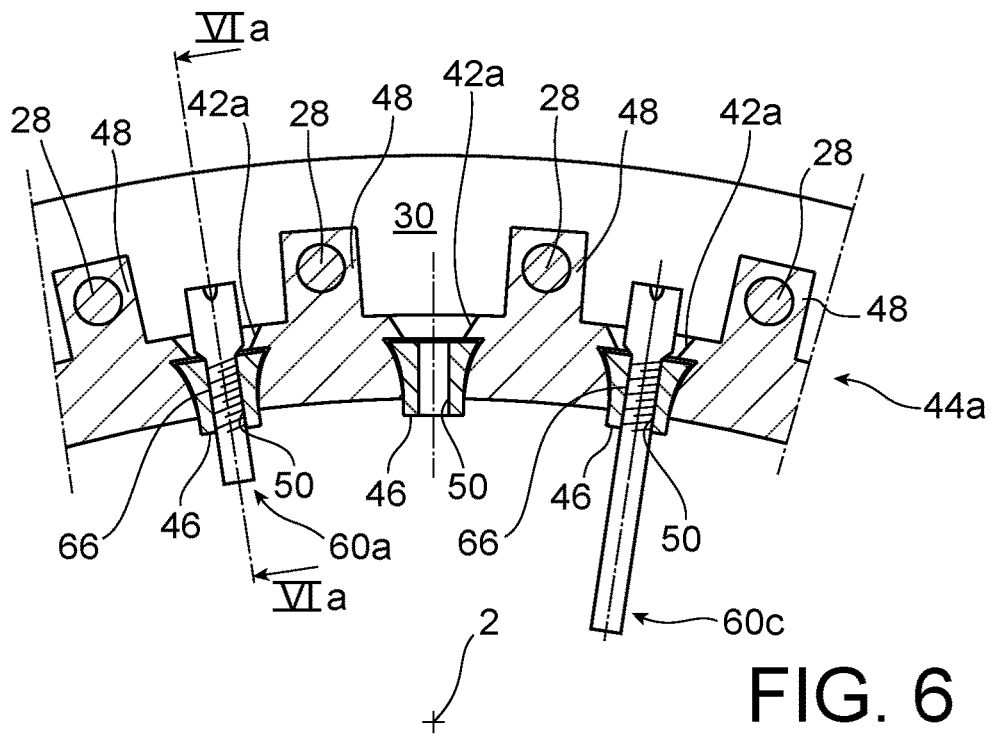
FIG. 6 is a cross-section view similar to that of FIG. 4, showing the balancing system equipped with its first balancing members following a temporary balancing operation.
Figure 6A:
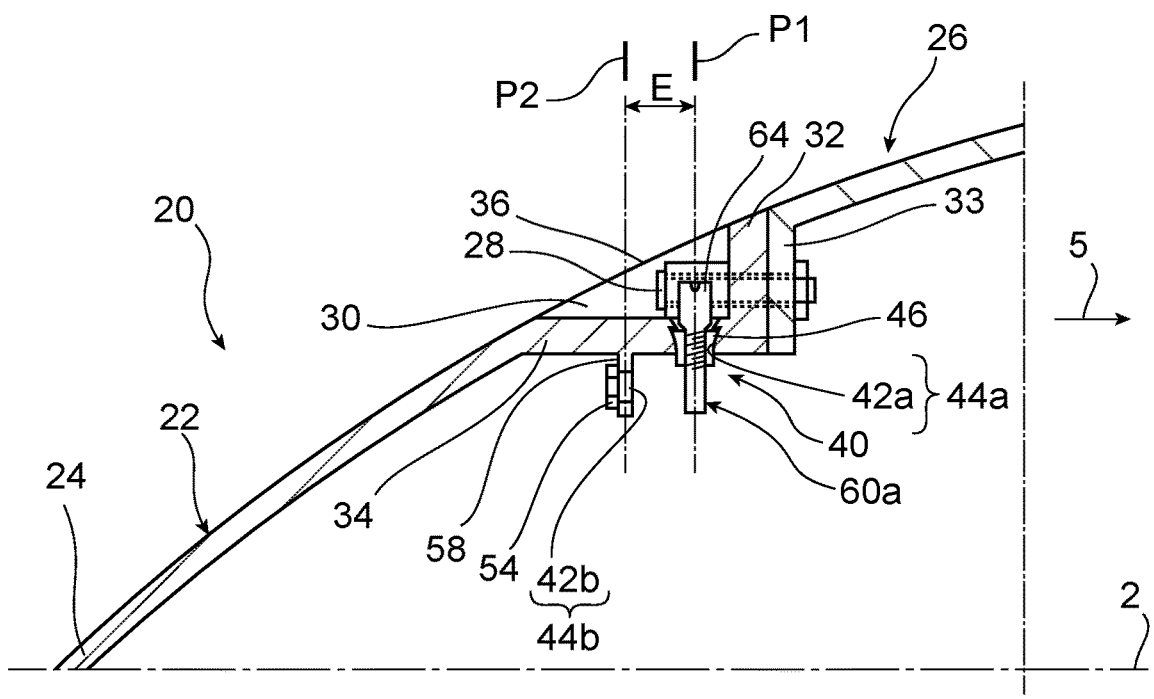
FIG. 6a corresponds to a cross-section view taken along lines VIa-VIa of FIG. 6.

The temporary balancing is similar to a conventional balancing, in that one or more screws 60a-60c are wisely radially arranged in one/several first mounting ports 42a, as has been depicted in FIGS. 6 and 6a. The fastening of a first screw 60a-60c is ensured by the cooperation between its thread 66 and the threaded inner port 50 of the nut 46 equipping the mounting port 42a concerned. The position of each first screw and the choice of its mass is made in a known manner by those skilled in the art, in order to reduce as much as possible the overall unbalance of the turbojet engine. The assembly of each first screw 60a-60c is readily made from outside the inlet cowl 20, by inserting it radially inwardly in the recess 30, and then in its associated first mounting port 42a. Once it is mounted, the head 64 of each screw 60a-60c is housed in this same recess 30.

During this first temporary balancing operation of the turbojet engine, made on the workbench, the second balancing plane is not used because only one or more first screws 60a-60c are arranged in one or more first ports 42a. In other words, the second balancing members do not intervene in the implementation of the temporary balancing operation. Once this is completed, the positions and masses of each first screw 60a-60c are recorded, and then the screws 60a-60c are removed from the first annular row 44a.

After this removal, an operation of repeating the temporary balancing is implemented, on the second annular row 44b. This repetition has the purpose of achieving the same overall unbalance correction, by placing appropriately second balancing members on the second row 44b. As a result, for each first port 42a that has been equipped with a first screw 60a-60c during the temporary balancing, the second port 42b which is located axially facing this first port is in turn equipped with a couple of second balancing members. This couple is chosen so as to provide an unbalance correction identical or similar to that generated with the first screw 60a-60c, by taking of course account of the difference in the diameter between both rows 44a, 44b. A correspondence table is thus set beforehand between the first and second balancing members having different masses, and based on these correspondences, the operators make the repetition, that is without requiring the implementation of a new balancing.

Figure 7:
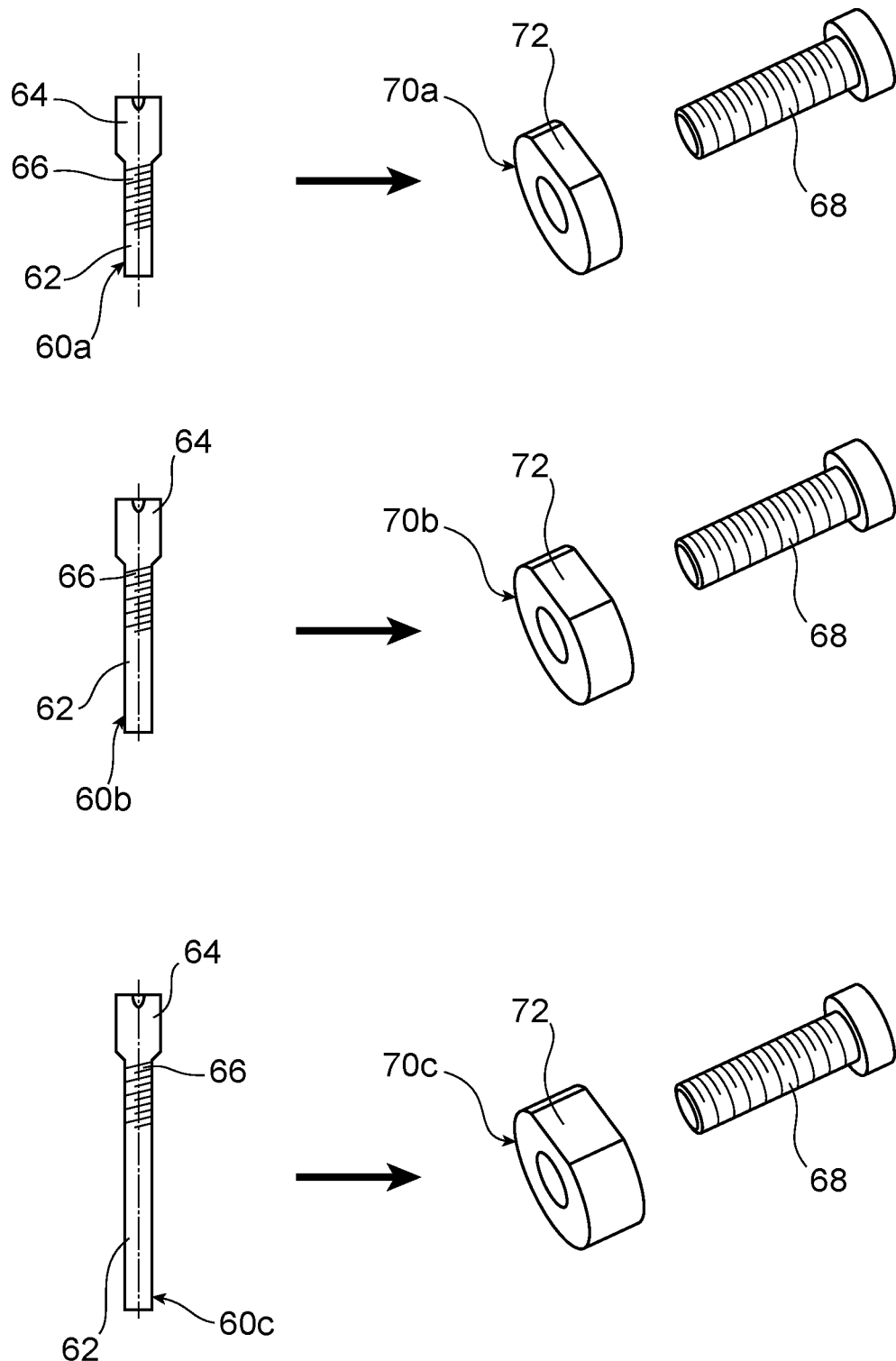
FIG. 7 is a schematic view of three distinct references for the second balancing members of the balancing system shown in the previous figures, and their correspondences with the first balancing members.

Both second balancing members forming the abovementioned couple respectively consist of a second balance screw 68, and a balance weight 70a, 70b, 70c for being pressed against the balancing inner clip 58, through the screw 68 of the couple. As has been depicted in FIG. 7, a reference of couple of second balancing members 68, 70a-70c providing the same unbalance correction corresponds to each reference of a first screw 60a-60c, when this couple is arranged on the second annular row 44b. As a result, for repeating the temporary balancing on this second row, three references of couple each comprising a same second screw 68, and a weight 70a-70c with a different mass in each couple are provided. Preferably, each of the three weights 70a-70c has the same diameter, only the thickness varying from one to the other so as to vary its mass. Further, in order to block rotation of the generally disc shaped weight, its peripheral edge can be equipped with a land 72 for abutting against the radially internal surface of the inner ring 34.

Figure 8:
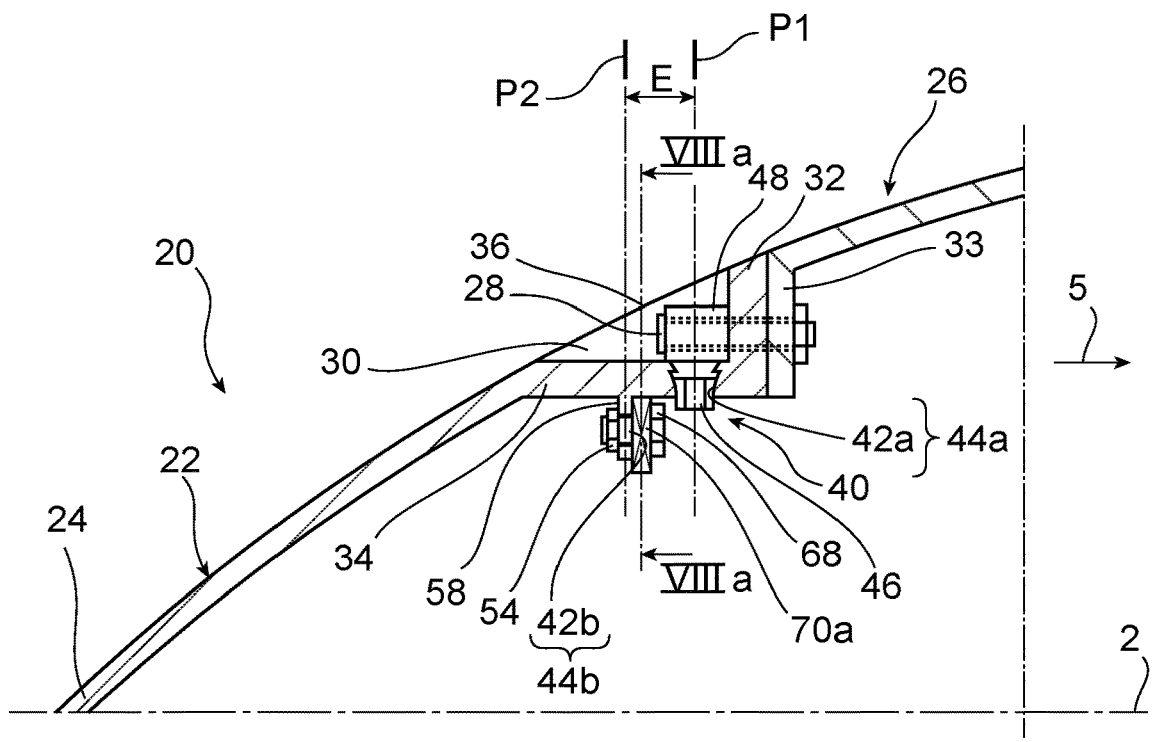
FIG. 8 is a cross-section view similar to that of FIG. 6a, showing the balancing system equipped with its second balancing members following an operation of repeating the temporary balancing on the second annular row of mounting ports.
Figure 8A:
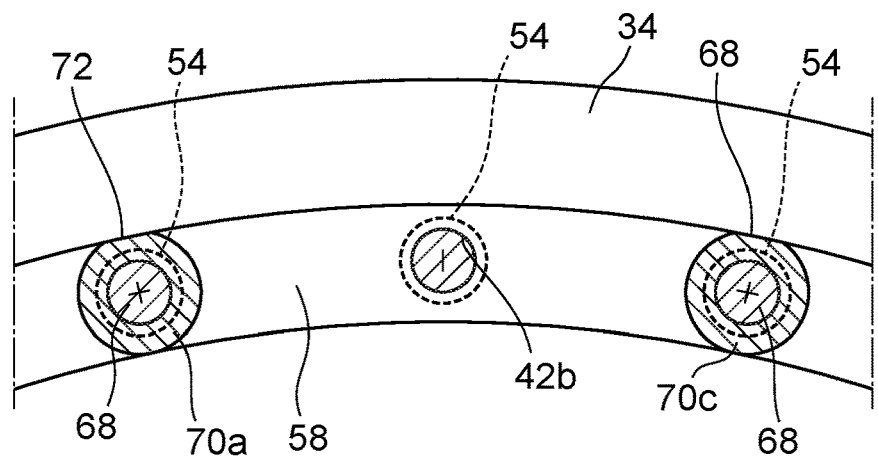
FIG. 8a corresponds to a cross-section view taken along lines VIIIa-VIIIa of FIG. 8.

For each second mounting port 42b concerned, the repeating operation depicted in FIGS. 8 and 8a thereby consists in mounting the corresponding weight 70a-70c against the balancing clip 58, and fastening it using the second balance screw 68 passing through the port 42b and screwed in the nut 54. Once the screw 68 is mounted in the second port 42b, its axis intersects that of the corresponding first mounting port 42a, released from its first balance screw as is more visible in FIG. 8.

Balancing the turbojet engine after mounting is thereby completed, which enables it to be delivered to an aircraft manufacturer or a third party with an enhanced balancing capacity. Indeed, upon delivery, all or part of the second mounting ports 42b are occupied by couples of second balancing members, whereas the first annular row 44a remains fully free. The rebalancing steps performed subsequently, throughout the lifetime of the engine, can consequently be readily made using the first balance screws, for equipping the first mounting ports of the first annular row.

Figure 9:
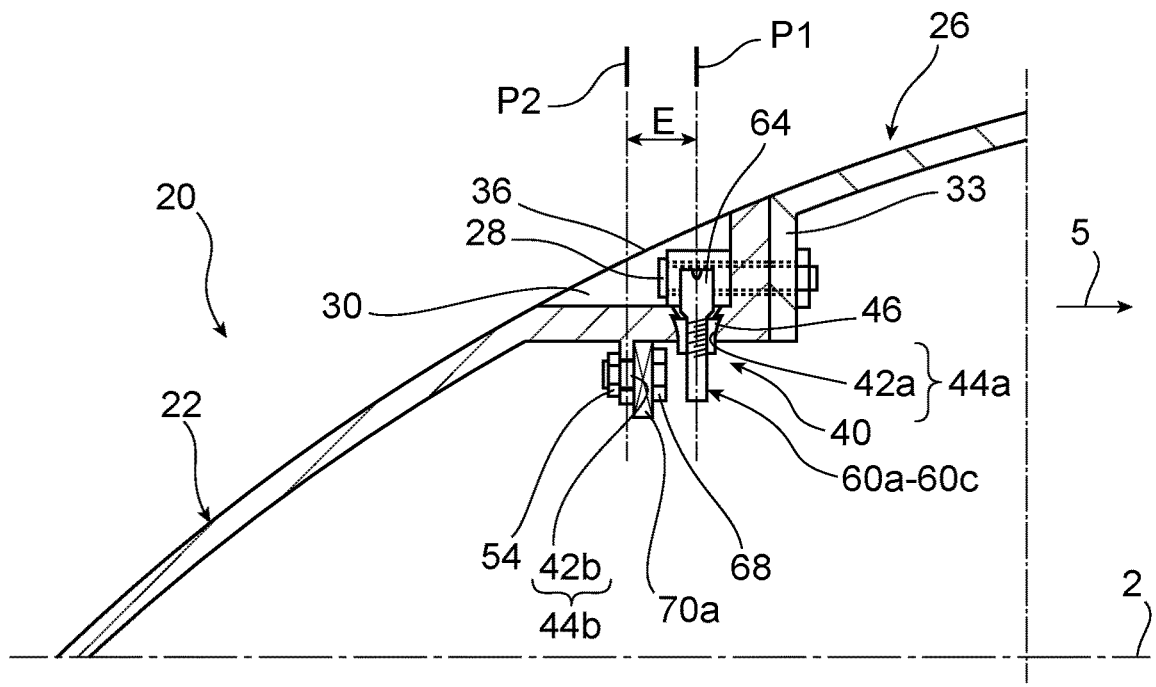
FIG. 9 represents a cross-section view similar to that of FIG. 8, showing the balancing system equipped with its first and second balancing members, following a subsequent rebalancing of the turbomachine.

In this respect, the invention also relates to a maintenance method for a turbojet engine, comprising a rebalancing step implemented on the first balancing plane P1. This rebalancing step, depicted in FIG. 9, consists in correcting once again the turbojet engine unbalance, when the previous correction turns out not to be appropriate any longer. Thus, the first rebalancing step is made by placing one or more first radial fastening screws 60a-60c on the ports 42a of the first row 44a being fully free. This first rebalancing step is made without modifying the first balancing present on the second plane P2, and it can relate to any first mounting port 42a of the row 44a. For example, a first screw 60a-60c can be mounted on a first port 42a axially located facing a second port 42b already provided with a couple of second balancing members 68, 70a.

During a next rebalancing step, the second balancing plane P2 remains thus maintained as such, since the operators only preferentially intervene on the first annular row 44b, by adding and/or removing and/or modifying one or more first balancing radial screws 60a-60c.

Consequently, after one or more rebalancing steps, each of the first and second mounting ports 42a, 42b is generally either free of balancing members, or equipped with one or more balancing members 60a-60c, 68, 70a-70c. More generally, after at least one turbojet engine rebalancing step, some of the first ports 42a are equipped with a first balance screw 60a-60c whereas other ones remain free, as well as some of the second ports 42b are equipped with a second balance screw 68 and a weight 70a-70c, whereas other ones among these second ports 42b remain free.

Figure 10:
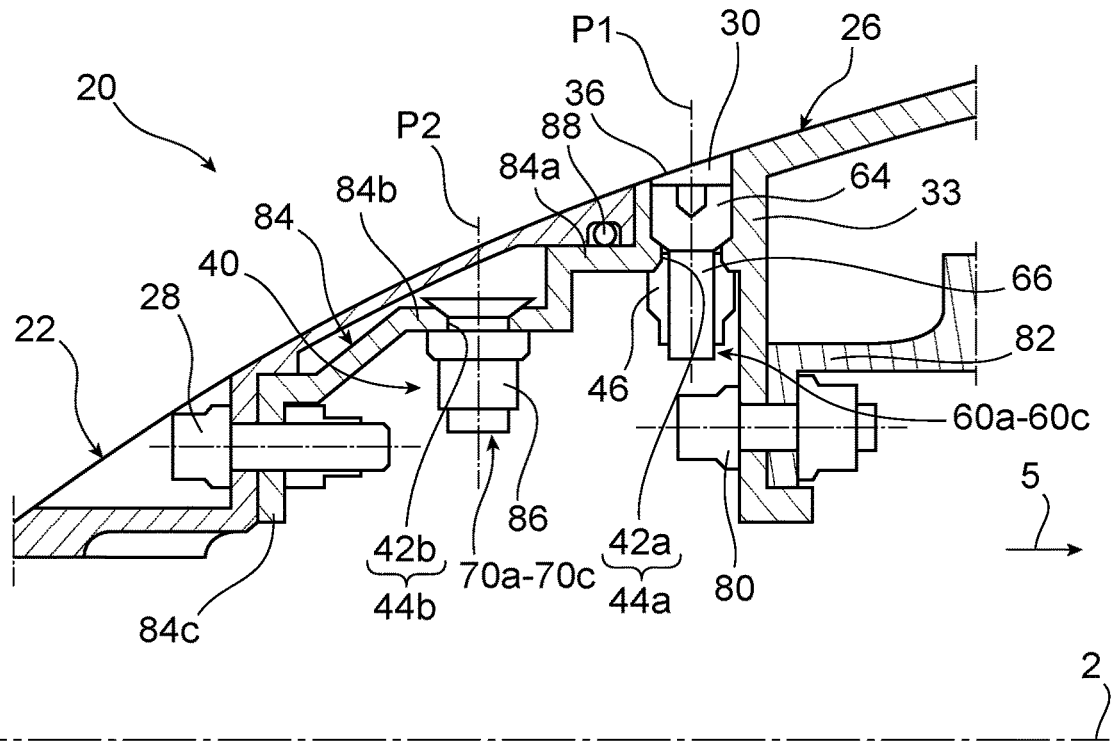
FIG. 10 is a view similar to that of FIG. 9, representing another preferred embodiment of the invention.

FIG. 10 represents a second preferred embodiment of the invention, similar to the first embodiment described above. Indeed, in the figures, the elements bearing the same reference numerals correspond to identical or similar elements. One of the main differences with the first embodiment resides in the manner of making the second balancing plane P2, since the second mounting ports 42b are herein radially oriented, as the first mounting ports 42a of the first balancing plane P1.

In this second embodiment, a nose cone 22 extending downstream by a shell 26 is also provided. The fastening clip 33 of the shell 26 is here fastened by bolts 80 to a fan disc 82, partially represented in FIG. 10.

Another feature of this second embodiment resides in the design of the shell 26, which now integrates an upstream extension 84 projecting axially upstream from the fastening clip 33. The extension 84 includes a first extension part 84a directly adjacent to the clip 33, and axially extending upstream. It is through this first extension part 84a that the first ports 42a are made, each receiving a crimped/captive nut 46 for receiving a first balancing member 60a-60c.

In the axial continuity of the first extension part 84a, the upstream extension 84 includes a second extension part 84b, through which the second ports 42b of the second annular row 44b are made. Here, the second balancing members take the form of second balance screws 70a-70c, fastened to the second extension part 84b by nuts 86. The latter, which also form balancing members, are preferentially arranged on one side of the part 84b opposite to the side against which the screw heads abut. Consequently, these are conventional, not necessarily crimped/captive nuts.

In the axial continuity of the second extension part 84a, the upstream extension 84 has a fastening part 84c which terminates with a radial fastening clip, enabling the nose cone 22 to be fastened via the bolts 28.

The fastening part 84c and the second extension part 84b are both radially covered with the downstream part of the nose cone 22. This cone 22 terminates at the first extension part 84a, which is not covered with the cone. Consequently, as in the first embodiment, the first mounting ports 42a of the first row 44a remain radially accessible from outside the cone 22 and the shell 26, which facilitates balancing operations on the plane P1.

Indeed, the first extension part 84a comprises the recesses 30 in which the screw heads 64 are located, which thus are also radially accessible from outside the cone 22 and the shell 26. By accessibility, it is meant a direct accessibility in the case where the recesses 30 remain radially outwardly open, but also an indirect accessibility in the case where each recess 30 is closed by an individual aerodynamic cowling 36, readily removable from the first extension part 84a.

It is also noted that a sealing device, such as an O-ring 88 centred on the axis 2, is arranged between the first extension part 84a and the downstream end of the cone 22. This seal enables in particular any water ingress into the cone 22 to be avoided. Its compression is ensured by the radial abutment of the downstream end of the cone 22 against an axial portion of the first extension part 84a.

Of course, various modifications can be provided by those skilled in the art to the invention just described, only by way of non-limiting examples, and the scope of which is defined by the appended claims. In particular, in the first embodiment, the second balancing members could be replaced by simple balance screws mounted in the second mounting ports, without the weights.

What is claimed is:

1. A balancing system (40) for balancing an aircraft turbomachine (1) having a longitudinal central axis (2), the system comprising a first annular row (44a) of first mounting ports (42a) for mounting balancing members (60a-60c), characterised in that it also includes a second annular row (44b) of second mounting ports (42b) for mounting balancing members (68, 70a-70c) axially offset from the first annular row (44a), and in that the number and the angular positions of the first mounting ports (42a) are identical to the number and angular positions of the second mounting ports (42b).

2. The balancing system according to claim 1, characterised in that the first ports (42a) are radially oriented, and in that the second ports (42b) are axially oriented.

3. The balancing system according to claim 1, characterised in that the first ports (42a) and the second ports (42b) are radially oriented.

4. The balancing system according to claim 1, characterised in that the first annular row (44a) has a diameter higher than that of the second annular row (44b).

5. The balancing system according to claim 1, characterised in that the first annular row (44a) is arranged downstream of the second annular row (44b).

6. The balancing system according to claim 1, characterised in that an axial offset (E) between the first and second annular rows (44a, 44b) is between 10 and 70 mm.

7. The balancing system according to claim 1, characterised in that each of the first and second mounting ports (42a, 42b) is:
either free of balancing member;
or equipped with one or more balancing members (60a-60c, 68, 70a-70c).

8. The balancing system according to claim 1, characterised in that the number of first mounting ports (42a) is between 15 and 25, and preferably equal to 20.

9. A rotary inlet cowl (20) of a turbomachine comprising a balancing system (40) according to claim 1, the cowl preferably comprising, a nose cone (22) extending downstream by a shell (26) fixedly mounted to this nose cone.

10. The cowl according to claim 9, characterised in that the first mounting ports (42a) of the first annular row (44a) are accessible from outside the cowl, and in that the second mounting ports (42b) of the second annular row (44b) are radially covered with a cowl element, preferably the nose cone (22).

11. The cowl according to claim 9, characterised in that the shell (26) includes an upstream extension (84) comprising a first extension part (84a) through which the first mounting ports (42a) of the first annular row (44a) are made, and, in the upstream continuity of the first extension part (84a), a second extension part (84b) through which the second mounting ports (42b) of the second annular row (44b) are made, said second extension part (84b) being radially covered with the front cone (22).

12. The cowl according to claim 11, characterised in that it includes a sealing device (88) between the first extension part (84a) and the downstream end of the cone (22).

13. An aircraft turbomachine (1) comprising a rotary inlet cowl (20) according to claim 10.

14. A method for mounting a turbomachine (1) according to claim 13, characterised in that it comprises a step of balancing the turbomachine, this balancing step including the following operations of:
temporarily balancing the turbomachine using at least one first balancing member (60a-60c) mounted to at least one first mounting port (42a) of the first annular row (44a), and by leaving each of the second mounting ports (42b) of the second annular row (44b) empty;
removing the first balancing members (60a-60c) assembled during the previous operation; and
repeating the temporary balancing on the second annular row (44b), by mounting one or more second balancing members (68, 70a-70c) on the second mounting port(s) (42b) axially arranged facing said at least one first mounting port (42a) that has been equipped with at least one first balancing member (60a-60c) during the temporary balancing operation, the second balancing member(s) (68, 70a-70c) being chosen such that for each second mounting port concerned, the second member(s) (68, 70a-70c) provide an unbalance correction identical or similar to that achieved with the first balancing member(s) (60a-60c) that have equipped the corresponding first mounting port (42a) during the temporary balancing operation.

15. A maintenance method for a turbomachine (1) according to claim 13, characterised in that it comprises a step of rebalancing the turbomachine, this rebalancing step being made from the balancing system (40) already provided with at least one second balancing member (68, 70a-70c) on at least one second mounting port (42b) of the second annular row (44b), and possibly also already provided with at least one first balancing member (60a-60c) on at least one first mounting port (42a) of the first annular row (44a),
and in that the rebalancing step is implemented without modifying the distribution of the second balancing member(s) (68, 70a-70c) on the second annular row (44b) of second mounting ports (42b), but only by adding, modifying or removing at least one first balancing member (60a-60c) on at least one first mounting port (42a) of the first annular row (44a).

* * * * *